No. 629,549. Patented July 25, 1899.
A. C. CULVER.
JOINT FOR PARTS OF MACHINERY.
(Application filed Mar. 23, 1899.)

(No Model.)

Witnesses.

Inventor:
Augustus C. Culver,
By Edward Taggart,
Atty

THE NORRIS PETERS CO., PHOTO-LITHO., WASHINGTON, D. C.

UNITED STATES PATENT OFFICE.

AUGUSTUS C. CULVER, OF GRAND RAPIDS, MICHIGAN, ASSIGNOR TO CHARLES H. BERKEY, OF SAME PLACE.

JOINT FOR PARTS OF MACHINERY.

SPECIFICATION forming part of Letters Patent No. 629,549, dated July 25, 1899.

Application filed March 23, 1899. Serial No. 710,233. (No model.)

*To all whom it may concern:*

Be it known that I, AUGUSTUS C. CULVER, a citizen of the United States, residing at Grand Rapids, in the county of Kent and State of Michigan, have invented new and useful Improvements in Joints for Parts of Machinery, of which the following is a specification.

This invention relates to a new and efficient means for detachably uniting two parts of machinery one of which is provided with a cylindrical socket. The same is peculiarly adapted for use in connection with the attachment of a bicycle seat-post and handle-bars for bicycles and may be applied to nearly all the bicycles as they are ordinarily constructed in order to adapt the same to receive the seat-post or handle-bar.

The objects of my invention are to provide a simple and efficient means for uniting any two parts of machinery one of which is provided with a socket; also, to limit the parts to the fewest number, thereby simplifying and cheapening the construction of such device. These objects I accomplish by means of the mechanism illustrated in the accompanying drawings, in which—

Figure 1:
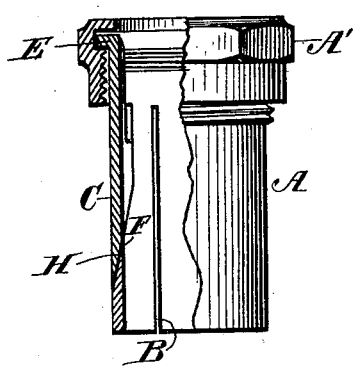
Figure 2:
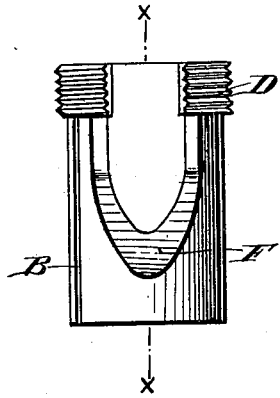
Figure 3:
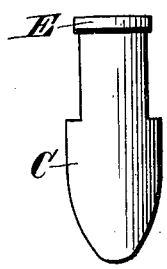
Figure 4:
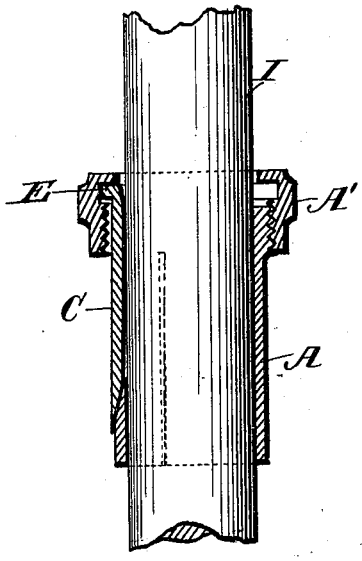

Figure 1 shows a side elevation, partly in section, of the attaching device. Fig. 2 shows also an elevation on the side of a cylinder having a slot or opening with the attaching-nut and the removable piece removed. Fig. 3 shows the convex side of the wedge-shaped movable piece which, in connection with the nut and cylinder, forms the attachment; and Fig. 4 shows a sectional view on line X X of Fig. 2 with a seat-post in position.

Similar letters refer to similar parts throughout the several views.

A represents the cylinder or shell, constructed with an opening, as shown in Fig. 2.

B represents a longitudinal slit in the lower end of the cylinder, adapted to allow the cylinder to be contracted when the wedge-shaped piece is moved downwardly by means of the nut A'. I have shown but one longitudinal slit B in the cylinder A; but the same may be provided with any suitable number of slits to enable the lower end portion thereof to be contracted. In practical use I prefer to employ at least two of these slits B.

C is the wedge-shaped piece which is provided with a flange E, which flange E engages with an annular groove in the nut A', the flange E being of suitable size to fit into the groove and to move or allow the nut to move without the flange binding in the annular groove.

D is a screw-thread upon the upper end of the shell or cylinder A, with which internal threads of the nut engage.

F shows the beveled portion of the slot or opening in the upper end of the cylinder A.

H shows the beveled or wedge-shaped form of the movable piece C. The form of the piece C is shown in cross-section in Fig. 1, and the beveled or wedge-shaped portion is shown by H.

I shows a seat-post or other rod or cylinder which is adapted to be attached by the means above described.

The operation of this invention is as follows: The seat-post I or other piece to which the attachment is to be made is placed within the cylinder A. The longitudinally-moving piece C is placed in position with the flange in the annular groove of the nut A'. The nut A' is then screwed down upon the screw-thread D, moving the wedge-shaped piece C downward, thereby compressing the cylinder A, so that the same will firmly clasp and become firmly and securely attached to the seat-post I. As this movable piece C is moved downwardly the longitudinally-moving piece C is pushed outwardly, so as to engage securely with the cylinder or tube which surrounds the short cylinder A, thereby attaching such outer cylinder through the intervention of the cylinder A and the movable wedge-shaped piece C both to the outer cylinder and to the seat-post I. By reversing the movement I note the movable piece C is drawn upward and ceases to engage with the outer surrounding tube, and the cylinder A will spring outwardly, so as to loose its hold upon the seat-post. The positive engagement of the movable piece C by means of the flange F with the annular groove in the nut A' gives a positive motion in either direction to the movable piece C as the nut is turned either one way or the other.

This device as constructed is peculiarly adapted for use in bicycles where the seat-post is secured to the seat mast or tubing of the bicycle, the post I being placed within the cylinder A and the cylinder A being inserted into the upper end of the bicycle-seat mast and the nut turned, so as to contract the cylinder A and to extend or push outwardly the convex surface of the longitudinal piece C. This device contains this peculiar advantage, that the number of pieces are the fewest possible for such attachment, and the outward pressure from the rounded or convex surface of the movable wedge-shaped piece C will not injure the outer cylinder nor cause the same to buckle, as is found to be the case where the pressure is made upon the outside of a cylindrical piece.

Having thus described my invention, what I claim to have invented, and desire to secure by Letters Patent, is—

1. The combination of a cylinder constructed to be contracted at its lower end portion and having a screw-threaded upper end portion and a slot, the edges of which have bevels facing outward, a nut screwing on the threads of the cylinder, and a longitudinally-movable piece or section loosely engaged with the nut, arranged in the slot and having beveled edges fitting the beveled edges of said slot and acting, when moved downward by the nut, to contract the lower end portion of the cylinder, substantially as described.

2. The combination of a longitudinally-slitted cylinder having a screw-threaded upper end and a slot, the edges of which have outer bevels, a nut screwing upon the cylinder, and a movable piece or section having a flange loosely engaged with the nut, arranged in said slot and provided with beveled edges fitting the beveled edges of the slot and acting to contract the slitted part of the longitudinally-slitted cylinder when moved down by the nut, substantially as and for the purposes described.

In testimony whereof I have hereunto set my hand in presence of two subscribing witnesses.

AUGUSTUS C. CULVER.

Witnesses:
ARTHUR C. DENISON,
DORA B. PARKER.